Dec. 19, 1922.
W. KYLE.
SUPPORTING SPRING.
FILED JUNE 1, 1921.
1,439,005.
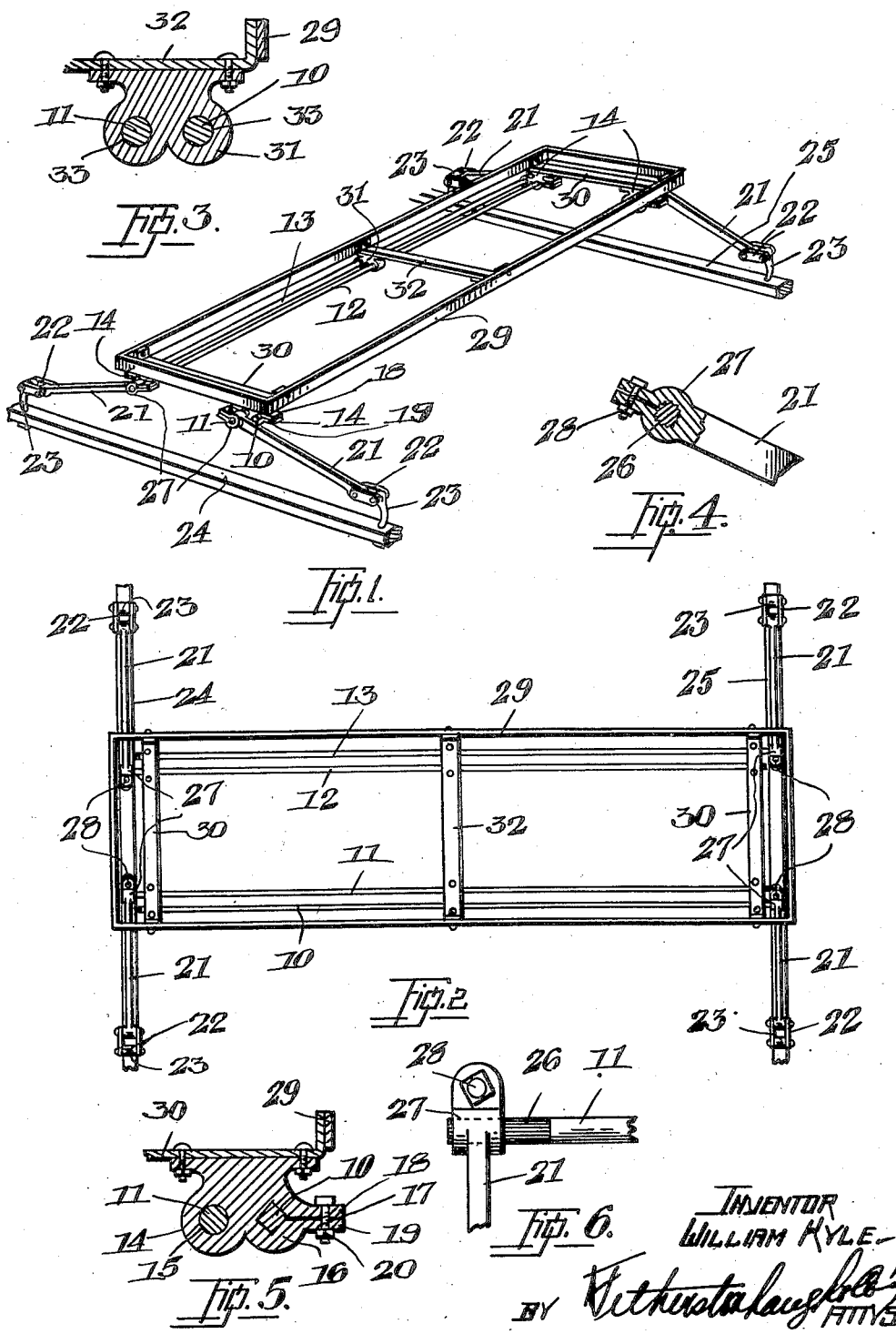
INVENTOR
WILLIAM KYLE
BY
ATTYS.

Patented Dec. 19, 1922.

1,439,005

UNITED STATES PATENT OFFICE.

WILLIAM KYLE, OF BELLEVILLE, ONTARIO, CANADA.

SUPPORTING SPRING.

Application filed June 1, 1921. Serial No. 474,102.

*To all whom it may concern:*

Be it known that I, WILLIAM KYLE, a subject of the King of Great Britain, and resident of the town of Belleville, in the Province of Ontario and Dominion of Canada, have invented certain new and useful Improvements in Supporting Springs, of which the following is a specification.

This invention relates to improvements in supporting springs, such as may be used to support the body of a vehicle from the axle or bed springs and generally wherever a yieldable support is desired with the minimum amount of rebound.

Further objects are to provide means for simple adjustment in the tension of the spring of the support.

Further objects still are generally to improve and simplify the construction to reduce the number of parts and better adapt the various parts to perform the functions required of them.

It consists essentially of the improved construction hereinafter described in detail in the accompanying specifications and drawings.

In the drawings:

Figure 1 is a perspective view of an embodiment of the present invention.

Figure 2 is a plan view of the same.

Figure 3 is a sectional view through the intermediate supporting brackets.

Figure 4 is a sectional detail, showing the connection between the torsion rod and connecting lever.

Figure 5 is a sectional detail through an end connecting bracket.

Figure 6 is a side elevation of the parts shown in Figure 4.

In the drawings, like characters of reference indicate corresponding parts in all the figures.

Referring to the drawings:

10, 11, 12 and 13 indicate four torsion rods of suitable spring steel adapted, when twisted axially, to return to normal position. These torsion rods are arranged in two pairs, and each torsion rod has a fixed and a free end, the free end of one torsion rod of each pair being adjacent to the fixed end of the other torsion rod of that pair.

In the embodiment illustrated, opposite ends of each pair of rods are supported by brackets 14 each of said brackets having a circular recess 15 adapted to receive and loosely support the free end of one torsion rod and a squared recess 16 designed to receive the squared end of the fixed end of the torsion rod; thus for instance, the bracket 14 at one end will support the round end of the rod 11 in the recess 15 while the squared end on the rod 10 will be supported in the recess 16.

In order to enable the fixed squared end of the torsion rod to be clamped in position, the side of the recess 16 is slotted at 17, and clamping lugs 18 and 19 are formed on opposite sides of the slots adapted to be tightened by a clamping bolt 20 by which the end of the torsion rod may be clamped in position.

The free end of each torsion rod projects beyond a bracket 14 and is connected to a lever 21. Where the supporting spring is used to support the body of an automobile, as illustrated, the levers 21 extend outwardly and are connected at their outer extremities by links 22 to brackets 23 on crossbars or axles 24 and 25. To provide for a slight adjustment in the tension of the spring, the connection between the torsion rods and the levers 21 is adjustable; thus, for instance, the end of the torsion rod may be formed with flutings 26 which fit corresponding flutings formed in the bifurcated end 27 of the lever 21, the bifurcated end being adapted to be clamped about the end of the rod by a clamping bolt 28.

All of the brackets 14 may be supported from a rectangular frame 29 which may be connected to or form part of the chassis of a vehicle, the bracket members 14 being connected to cross-bars 30 on the frame 29. Support may be given to the torsion rods intermediate of their length by means of brackets 31 provided on a cross-bar 32 and having perforations 33 through which the torsion rods extend.

It will be seen that, when a load or weight is placed on the frame 29, the levers 21 extending downwardly in an inclined direction, the weight will cause the torsion rods to be twisted axially, and the spring metal from which they are composed will tend to return to normal position. The variation of the tension will be made by varying the size of the rod. If desired, a different tension might be provided at one end to that of the other by varying the size of the rods connected to the levers at opposite ends.

As many changes could be made in the above construction, and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A supporting spring of the character described comprising torsion rods each having a free end and a fixed end, means for adjustably supporting and clamping the fixed rod ends and means comprising bifurcated levers provided with clamping bolts and shackle supported on the vehicle frame designed to adjustably support and clamp the free rod ends.

In witness whereof I have hereunto set my hand in the presence of a witness.

WILLIAM KYLE.

Witness:
RUSSEL S. SMART.